(12) United States Patent
Yoo et al.

(10) Patent No.: US 12,718,119 B2
(45) Date of Patent: Aug. 25, 2026

(54) METHOD AND SYSTEM FOR PROVIDING ANNOTATION INFORMATION FOR TARGET DATA THROUGH HINT-BASED MACHINE LEARNING MODEL

(71) Applicant: LUNIT INC., Seoul (KR)

(72) Inventors: In Wan Yoo, Seoul (KR); Donggeun Yoo, Seoul (KR)

(73) Assignee: LUNIT INC., Seoul (KR)

( * ) Notice: Subject to any disclaimer, the term of this patent is extended or adjusted under 35 U.S.C. 154(b) by 1229 days.

(21) Appl. No.: 17/383,937

(22) Filed: Jul. 23, 2021

(65) Prior Publication Data

US 2022/0092448 A1 Mar. 24, 2022

(30) Foreign Application Priority Data

Sep. 22, 2020 (KR) ........................ 10-2020-0122591

(51) Int. Cl.
*G06N 5/04* (2023.01)
*G06N 20/00* (2019.01)

(52) U.S. Cl.
CPC ............... *G06N 5/04* (2013.01); *G06N 20/00* (2019.01)

(58) Field of Classification Search
CPC ............ G06N 5/04; G06N 20/00; G06N 3/04; G06N 3/063; G06N 3/08
See application file for complete search history.

(56) References Cited

U.S. PATENT DOCUMENTS

| | | | | |
|---|---|---|---|---|
| 10,572,996 | B2 * | 2/2020 | Eurèn | G06F 18/214 |
| 2014/0037198 | A1 * | 2/2014 | Larlus-Larrondo | G06T 7/11 382/173 |
| 2018/0204111 | A1 * | 7/2018 | Zadeh | G06N 3/043 |
| 2020/0226422 | A1 * | 7/2020 | Li | G06N 3/08 |
| 2021/0034920 | A1 * | 2/2021 | Edgar | G06N 5/04 |
| 2021/0279636 | A1 * | 9/2021 | Staar | G06N 20/00 |
| 2021/0334955 | A1 * | 10/2021 | Roth | G06N 3/08 |

FOREIGN PATENT DOCUMENTS

| | | |
|---|---|---|
| KR | 102073873 B1 | 2/2020 |
| KR | 102144672 B1 | 8/2020 |
| KR | 1020200092805 A | 8/2020 |

* cited by examiner

*Primary Examiner* — Kamran Afshar
*Assistant Examiner* — Brian J Hales
(74) *Attorney, Agent, or Firm* — Sughrue Mion, PLLC

(57) ABSTRACT

Provided is a method for training a hint-based machine learning model configured to infer annotation information for target data, including obtaining training data for the machine learning model, wherein the training data includes a plurality of target data items provided with a plurality of annotation information items, and extracting a plurality of pixel groups from the plurality of target data items. The extracted plurality of pixel groups may be included in hint information. In addition, the method includes obtaining, from the plurality of annotation information items, a plurality of annotation classes corresponding to the extracted plurality of pixel groups to include the obtained plurality of annotation classes in the hint information, and training, by using the hint information, the machine learning model to infer the plurality of annotation information items associated with the plurality of target data items.

20 Claims, 16 Drawing Sheets
(11 of 16 Drawing Sheet(s) Filed in Color)

METHOD AND SYSTEM FOR PROVIDING ANNOTATION INFORMATION FOR TARGET DATA THROUGH HINT-BASED MACHINE LEARNING MODEL

CROSS-REFERENCE TO RELATED APPLICATIONS

This application claims priority from Korean Patent Application No. 10-2020-0122591, filed on Sep. 22, 2020, in the Korean Intellectual Property Office, the disclosure of which is incorporated herein by reference in its entirety.

TECHNICAL FIELD

The present disclosure relates to a method and system for training a hint-based machine learning model configured to infer annotation information for target data, and providing the annotation information for the target data through the trained hint-based machine learning model. More particularly, the disclosure relates to a method and system for outputting annotation information for target data from a hint-based machine learning model by using hint information and the target data.

BACKGROUND ART

In recent years, as hardware such as processors, memories, and cameras are fast developed, artificial intelligence (AI) technology has been developed and is receiving increasing attention. For example, research on applying these AI technologies to the field of image processing is being actively conducted.

Supervised learning is a machine learning method for constructing an artificial neural network model for performing inference on input data by learning a dataset tagged with label information (that is, correct answer information). Annotation work for tagging label information to generate a training dataset is usually performed by humans, and most of the annotation work is time consuming and expensive, and it is also almost impossible to perform the annotation work while maintaining consistency.

Meanwhile, regarding the process of generating the training data of the artificial neural network model for automatically generating the labels for the target data, a method has been recently proposed, in which the part that is easy for the artificial neural network to infer is first inferred and then the inferred part is modified by an annotator. However, according to this method, since the annotator confirms or modifies the inference result of the artificial neural network, there may be a bias to the inference result initially presented by the artificial neural network, and accordingly, there may be a tendency to review roughly.

In addition, when the annotator performs an annotation work on target data, the annotator may mark a line or region through an input device such as a computer mouse, keyboard, or the like to indicate at least one region included in the target data. However, the region intended to be marked in the target data (e.g., pathological slide images or patch images) may represent specific tissues or cells. Since these specific tissues or cells are not standardized, the annotator may not be able to quickly perform the work to accurately indicate the corresponding region, and feel fatigued.

SUMMARY

In order to solve the problems described above, the present disclosure provides a method and system for providing annotation information for target data through a hint-based machine learning model.

The method and system according to the present disclosure may train a machine learning model to infer a plurality of annotation information items associated with a plurality of target data items by using hint information for the plurality of target data items.

Instead of first providing an inference result of target data to the annotator, the method and system according to the present disclosure may receive hint information from an annotator and provide annotation information inferred through the hint-based machine learning model to an annotator terminal.

The method and system according to the present disclosure may receive information for correcting annotation information inferred through the hint-based machine learning model from the annotator terminal, and provide annotation information inferred again with the correction information to the annotator terminal.

The present disclosure may be implemented in various ways, including a method, an annotation terminal, an information processing system, or a computer-readable storage medium storing instructions, and a computer program.

According to an embodiment, a method for training a hint-based machine learning model configured to infer annotation information for target data is provided, which may include obtaining training data for the machine learning model, wherein the training data includes a plurality of target data items provided with a plurality of annotation information items, extracting a plurality of pixel groups from the plurality of target data items, wherein the extracted plurality of pixel groups are included in hint information, obtaining, from the plurality of annotation information items, a plurality of annotation classes corresponding to the extracted plurality of pixel groups to include the obtained plurality of annotation classes in the hint information, and training, by using the hint information, the machine learning model to infer the plurality of annotation information items associated with the plurality of target data items.

In addition, the extracting a plurality of pixel groups from the plurality of target data items may include extracting at least a partial region in each of the plurality of target data items as a plurality of pixel groups of the hint information, and the obtaining the plurality of annotation classes may include obtaining a plurality of annotation classes corresponding to at least the partial region in each of the plurality of target data items to including the obtained annotation classes in the hint information.

In addition, the training the machine learning model to infer the plurality of annotation information items associated with the plurality of target data items may include encoding the hint information into the plurality of target data items, and inputting the encoded plurality of target data items into the machine learning model for training the machine learning model to infer the plurality of annotation information items associated with the encoded plurality of target data items.

In addition, the encoding the hint information into the plurality of target data items may include expanding a region corresponding to the extracted plurality of pixel groups within the plurality of target data items, associating the plurality of annotation information items corresponding to the plurality of pixel groups with the expanded region, and including the expanded region and the associated plurality of annotation information items in the hint information.

In addition, the encoding the hint information into the plurality of target data items may include determining colors for representing a plurality of annotation classes included in the hint information, and applying the determined colors to the extracted plurality of pixel groups in the plurality of target data items.

In addition, the encoding the hint information into the plurality of target data items may include adding one or more channels to the plurality of target data items, and applying a numerical value for representing a plurality of annotation classes included in the hint information to the added one or more channels.

In addition, the encoding the hint information into the plurality of target data items may include generating patterns for representing a plurality of annotation classes included in the hint information, and applying the generated patterns to the extracted plurality of pixel groups in the plurality of target data items.

In addition, the training the machine learning model to infer the plurality of annotation information items associated with the plurality of target data items may include inputting the hint information and the plurality of target data items into the machine learning model for training the machine learning model to infer the plurality of annotation information items associated with the plurality of target data items.

According to another embodiment of the present disclosure, a method for providing annotation information for target data through a hint-based machine learning model is provided, in which the method may be performed by one or more computing devices and may include providing the target data to an annotator terminal, receiving, from the annotator terminal, first annotation information for at least a partial region in the target data as first hint information, outputting second annotation information for the target data through the hint-based machine learning model by using the first hint information and the target data, and providing the output second annotation information for the target data to the annotator terminal.

In addition, the method may further include receiving, from the annotator terminal, third annotation information including information for correcting the second annotation information as second hint information, outputting fourth annotation information for the target data through the hint-based machine learning model by using the second hint information and the target data, and providing the output fourth annotation information for the target data to the annotator terminal.

In addition, the method may further include receiving, from the annotator terminal, confirmation for the fourth annotation information, and storing the confirmed fourth annotation information and the target data as a training dataset for the hint-based machine learning model.

In addition, the confirmed fourth annotation information may be given a higher weight than that of a plurality of training data items included in the stored training dataset.

In addition, the providing the target data to the annotator terminal may include inputting the target data into the hint-based machine learning model to infer one or more initial annotation information items for the target data, associating the inferred one or more initial annotation information items with the target data, and providing target data associated with the one or more initial annotation information items to the annotator terminal.

In addition, the first annotation information may include feedback information on at least some of the one or more initial annotation information items.

In addition, the method may include receiving, from the annotator terminal, feedback information on the second annotation information for the target data.

In addition, the receiving the feedback information on the second annotation information for the target data includes receiving, from the annotator terminal, confirmation for the second annotation information and storing the confirmed second annotation information and the target data.

In addition, the storing the confirmed second annotation information and the target data includes storing the confirmed second annotation information and the target data as a training dataset for the hint-based machine learning model, and the confirmed second annotation information is given a higher weight than that of a plurality of training data items included in the stored training dataset.

In addition, the receiving the feedback information on the second annotation information for the target data includes receiving, from the annotator terminal, third annotation information including information for correcting the second annotation information and storing the corrected third annotation information and the target data.

In addition, the storing the confirmed second annotation information and the target data includes storing the confirmed second annotation information and the target data as a training dataset for the hint-based machine learning model.

An information processing system according to an embodiment is provided, which may include a memory storing one or more instructions, and a processor configured to provide target data to an annotator terminal; receive, from the annotator terminal, first annotation information for at least a partial region in the target data as first hint information; output second annotation information for the target data through the hint-based machine learning model by using the first hint information and the target data; and provide the output second annotation information for the target data to the annotator terminal.

According to some embodiments of the present disclosure, by receiving hint information first without providing the result determined by the machine learning model to the annotator, an annotation can be obtained, which more accurately reflects the determination of the annotator.

According to some embodiments of the present disclosure, since the minimum inputs for the hint information are received from the annotator, an amount of work can be reduced and the efficiency of the annotation work can be improved.

According to some embodiments of the present disclosure, it is possible to obtain an annotation with higher accuracy, because, before the annotation information is inferred, an inference result is output based on the hint information received from the annotator and correction information for the hint-based inference result is again received from the annotator.

The effects of the present disclosure are not limited to the effects described above, and other effects not described will be able to be clearly understood by those of ordinary skill in the art (hereinafter, referred to as "ordinary technician") from the description of the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the present disclosure will be described with reference to the accompanying drawings described below, in which like reference numerals denote like elements, but are not limited thereto:

FIG. 9 is a diagram illustrating an example of inputting target data and hint information to a machine learning model respectively and inferring annotation information, according to another embodiment;

DETAILED DESCRIPTION

Figure 1:
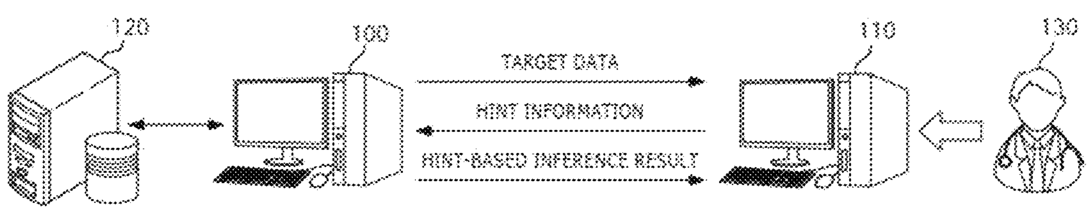
FIG. 1 is an exemplary configuration diagram illustrating a system for providing annotation information for target data according to an embodiment.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding elements are assigned the same reference numerals. In addition, in the following description of the embodiments, duplicate descriptions of the same or corresponding components may be omitted. However, even if descriptions of elements are omitted, it is not intended that such elements are not included in any embodiment.

Advantages and features of the disclosed embodiments and methods of accomplishing the same will be apparent by referring to embodiments described below in connection with the accompanying drawings. However, the present disclosure is not limited to the embodiments disclosed below, and may be implemented in various different forms, and the present embodiments are merely provided to make the present disclosure complete, and to fully disclose the scope of the invention to those skilled in the art to which the present disclosure pertains.

The terms used herein will be briefly described prior to describing the disclosed embodiments in detail. The terms used herein have been selected as general terms which are widely used at present in consideration of the functions of the present disclosure, and this may be altered according to the intent of an operator skilled in the art, conventional practice, or introduction of new technology. In addition, in a specific case, a term is arbitrarily selected by the applicant, and the meaning of the term will be described in detail in a corresponding description of the embodiments. Therefore, the terms used in the present disclosure should be defined based on the meaning of the terms and the overall contents of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to reproduce one or more processors. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" or "units" may be combined into a smaller number of components and "modules" or "units," or further divided into additional components and "modules" or "units."

According to an embodiment, the "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a plurality of microprocessors, one or more microprocessors in conjunction with a DSP core, or any other combination of such configurations. In addition, the "memory" should be interpreted broadly to encompass any electronic component capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with a processor is in electronic communication with the processor.

In the present disclosure, the "system" may refer to at least one of a server device and a cloud device, but not limited thereto. For example, the system may include one or more server devices. As another example, the system may include one or more cloud devices. As another example, the system may be configured together with both a server device and a cloud device and operated.

In the present disclosure, the "target data" or the "target data item" may refer to any data or data item that can be used for training a machine learning model, and may include, for example, data representing an image, data representing voice or voice characteristics, and data representing specific information (information associated with manufacturing, distribution, logistics, finance, strategy/utilities, services, education, automobiles, games, public industries and services, marketing/advertising, healthcare, media/communications, consumer goods, etc.), but is not limited thereto. For example, the target data may include the entire pathological slide image and/or at least one patch included in the pathological slide image. In addition, the target data may be tagged with annotation information or label information through an annotation work.

In the present disclosure, a "pixel group" refers to a portion of the target data extracted or sampled from the target data. For example, when the target data is an image, a plurality of pixel groups may refer to one or more pixels representing a specific shape in the image. In an example, the specific shape may refer to any shape that may be generated by extracting a partial region in the image, and may have, for example, a shape of at least one or more points, lines, figures (e.g., circles, triangles, squares, hexagons, etc.), or any combination thereof, but is not limited thereto.

In the present disclosure, a "hint" or hint information refers to information including a part of the target data sampled from the target data and annotation information corresponding thereto. For example, when the target data is a pathological slide image or a patch image, a plurality of pixel groups generated by sampling the pathological slide image or patch image and a plurality of annotation classes corresponding thereto may be referred to as the hints. In addition, when the annotator designates a partial region in the pathological slide image and inputs the annotation information through an initial annotation work, it may be referred to as the hint or the hint information. In addition, the hint or the hint information may refer to brief annotation information for the target data. According to an embodiment, the hint or the hint information may be annotation information in a simplified form rather than general annotation information about the target data, and may be annotation information of a less detailed level than general annotation information. For example, the annotation input of the annotator inputting the hint or the hint information may include an initial input, a simple annotation input, a rough annotation, a scribble annotation, a minimal annotation, an initial annotation, at least one or more points, lines, curves, figures (e.g., circles, triangles, rectangles, hexagons, etc.), etc.

In the present disclosure, the "pathology slide image" refers to an image obtained by capturing a pathological slide fixed and stained through a series of chemical treatments in order to observe a tissue removed from a human body with a microscope. For example, the pathology slide image may refer to a digital image captured with a microscope, and may include information on cells, tissues, and/or structures in the human body. In addition, the pathological slide image may include one or more patches, and the one or more patches may be tagged with annotation information or label information through the annotation work.

In the present disclosure, the "patch" or the "patch image" may refer to a small region within the pathological slide image. For example, the patch may include a region corresponding to a semantic object extracted by performing segmentation on the pathology slide image. As another example, the patch may refer to a combination of pixels associated with the label information generated by analyzing the pathology slide image.

In the present disclosure, the "machine learning model" may include any model that is used for inferring an answer to a given input. According to an embodiment, the machine learning model may include an artificial neural network model including an input layer, a plurality of hidden layers, and output layers. In an example, each layer may include a plurality of nodes. In an example, the machine learning model may be trained to infer annotation information for the target data. For example, the hint-based machine learning model may be trained to infer annotation information for at least one patch included in the pathological slide image and/or the pathological slide by using the hint information. The annotation information generated through annotation work may be used as the hint information to train the machine learning model. In addition, the machine learning model may include weights associated with a plurality of nodes included in the machine learning model. In an example, the weight may include any parameter associated with the machine learning model. In the present disclosure, the machine learning model may refer to the artificial neural network model, and the artificial neural network model may refer to the machine learning model.

In the present disclosure, "training" may refer to any process of changing a weight associated with the machine learning model by using the target data and the annotation information. According to an embodiment, the hint-based machine learning model is trained to infer a plurality of annotation information items associated with a plurality of target data items by using the hint information including a plurality of pixel groups and a plurality of annotation classes extracted from the target data.

In the present disclosure, the "annotation information" is correct answer information of the data sample information, which is obtained as a result of the annotation task. The annotation or the annotation information may be used interchangeably with the term such as label, tag, etc. in the art.

In the present disclosure, the "information item" may refer to information, and the information may refer to the information item. Likewise, the "data item" may refer to data, and the data may refer to the data item.

In the present disclosure, "similar" may encompass sameness and similarity. For example, the similarity of two pieces of information may refer to that the two pieces of information are the same as or similar to each other.

In the present disclosure, "each of a plurality of A" may refer to each of all components included in the plurality of A, or may refer to each of some of the components included in a plurality of A. For example, each of the plurality of target data items may refer to each of all target data items included in the plurality of target data items or may refer to each of some target data items included in the plurality of target data items.

In the present disclosure, "instructions" may refer to one or more instructions grouped based on functions, which are the components of a computer program and executed by the processor.

In the present disclosure, the "annotator" may refer to an annotator terminal, and the "annotator terminal" may refer to the annotator. That is, the annotator and the annotator terminal may be used interchangeably herein.

FIG. 1 is an exemplary configuration diagram illustrating a system for providing annotation information for target data according to an embodiment. As illustrated, the system for providing annotation information for target data may include an information processing system 100, an annotator terminal 110, and a storage system 120. In an example, the information processing system 100 may be configured to be connected communicatively to each of the annotator terminal 110 and the storage system 120. In FIG. 1, one annotator terminal 110 is shown, but the present disclosure is not limited thereto, and a plurality of annotator terminals 110 may be configured to be connected communicatively to the information processing system 100. In addition, while the information processing system 100 is shown as one computing device in FIG. 1, embodiment is not limited thereto, and the information processing system 100 may be configured to process information and/or data in a distributed manner through a plurality of computing devices. In addition, while the storage system 120 is shown as a single device in FIG. 1, embodiment is not limited thereto, and the system may be configured with a plurality of storage devices or as a system that supports a cloud. In addition, respective components of the system for providing annotation information for the target data shown in FIG. 1 represent functional components that can be divided on the basis of functions, and in an actual physical environment, a plurality of components may be implemented as being incorporated with each other.

The information processing system 100 and the annotator terminal 110 are any computing devices that are used for generating the hint information and/or the annotation information for the target data. In an example, the computing device may refer to any type of device equipped with a computing function, and may be a notebook, a desktop, a laptop, a server, a cloud system, etc., for example, but is not limited thereto.

The annotator terminal 110 may receive the target data from the information processing system 100 and provide the hint information and/or the annotation information on the received target data. According to an embodiment, the annotator 130 may perform a hint information generation work and/or an annotation work on the received target data. For example, the annotator terminal 110 may be configured to receive, through input of the annotator, the first annotation information for at least a partial region in the target data as the first hint information. The hint information and/or the annotation information generated through this work may be provided to the information processing system 100 together with the corresponding target data.

According to an embodiment, the annotator terminal 110 may receive a hint-based inference result from the information processing system 100. For example, the annotator terminal 110 may receive the second annotation information for the target data from the information processing system 100. This second annotation information may be inferred or output through a hint-based machine learning model by using the first hint information and the target data. The second annotation information inferred or output as described above may be output by the annotator terminal 110 and provided to the annotator 130.

According to an embodiment, the annotator 130 may input annotation correction information for the received hint-based inference result to the annotator terminal 110, and the annotator terminal 110 may provide the annotation correction information to the information processing system 100. For example, the annotator terminal 110 may receive the third annotation information including information for correcting the second annotation information, which is the received first hint-based inference result, as the second hint information. Then, the second hint information and the target data may be provided to the information processing system. The information processing system may generate the fourth annotation information (the second hint-based inference result) for the target data and provide it to the annotator terminal 110. This fourth annotation information may be output through the hint-based machine learning model by using the hint information and the target data. The fourth annotation information provided as described above may be output to the annotator terminal 110 and provided to the annotator 130.

According to another embodiment, the annotator terminal 110 may receive one or more initial annotation information items for the target data from the information processing system 100. One or more initial annotation information items for the target data may be inferred through the hint-based machine learning model, and the inferred one or more initial annotation information items may be associated with target data. In addition, when the annotator terminal 110 outputs the one or more initial annotation information items for the target data to the annotator 130, by the annotator 130, the feedback information for at least some of one or more initial annotation information items, that is, the first annotation information may be received. This first annotation information may be provided to the information processing system together with the target data.

The annotator 130 may input a completion response to the received hint-based inference result, and the annotator terminal 110 may provide this completion response to the information processing system 100. According to an embodiment, the annotator terminal 110 may receive confirmation on the second annotation information (the first hint-based inference result) or the fourth annotation information (the second hint-based inference result) through input of the annotator 130. The second annotation information or the fourth annotation information confirmed as described above may be stored as a training dataset for the hint-based machine learning model together with the target data. During training, the second annotation information or the fourth annotation information may be given a higher weight than a plurality of training data items included in the stored training dataset.

The information processing system 100 may generate the hint information based on a plurality of target data items and a plurality of annotation information items corresponding to the plurality of target data items. In an example, the hint information may include a plurality of pixel groups included in the target data and the annotation information items corresponding thereto. For example, the information processing system 100 may receive the hint information from the annotator terminal 110, and generate hint information same as or similar to the hint information generated by the annotator 130 based on the target data and the annotation information item, in order to provide the hint-based inference result corresponding to the hint information to the annotator terminal 110.

According to an embodiment, the information processing system 100 may obtain training data including a plurality of target data items provided with a plurality of annotation information items. The training data may include a pixel group representing a specific shape extracted from each of a plurality of target data items, and an annotation class corresponding to the pixel group. The information processing system 100 may use this training data to train the hint-based machine learning model to infer a plurality of annotation information items associated with a plurality of target data items.

According to another embodiment, the information processing system 100 may receive the target data, and the first annotation information on at least a partial region in the target data, that is, the hint information, from the annotator terminal 110. Then, the information processing system 100 may output the second annotation information for the target data through the hint-based machine learning model by using the first annotation information and the target data. The output second annotation information for the target data may be provided to the annotator terminal 110.

The storage system 120 is a device or a cloud system that stores and manages various data associated with the hint-based machine learning model configured to infer annotation information for the target data. For efficient data management, the storage system 120 may store and manage various types of data using a database. In an example, the various data may include any data associated with the machine learning model, and include, for example, a file of the target data, meta information of the target data, an annotation information item for the target data that is a result of an annotation work, hint information, data related to the annotation work, a machine learning model, etc., but is not limited thereto. While FIG. 1 shows the information processing system 100 and the storage system 120 as separate systems, embodiment is not limited thereto, and they may be incorporated into one system. In addition, while FIG. 1 shows one annotator terminal 110 being configured to communicate with the information processing system 100, embodiment is not limited thereto, and a plurality of annotator terminals may communicate with the information processing system 100 to provide hint information about the hint-based machine learning model or obtain hint-based inference results.

Figure 2:
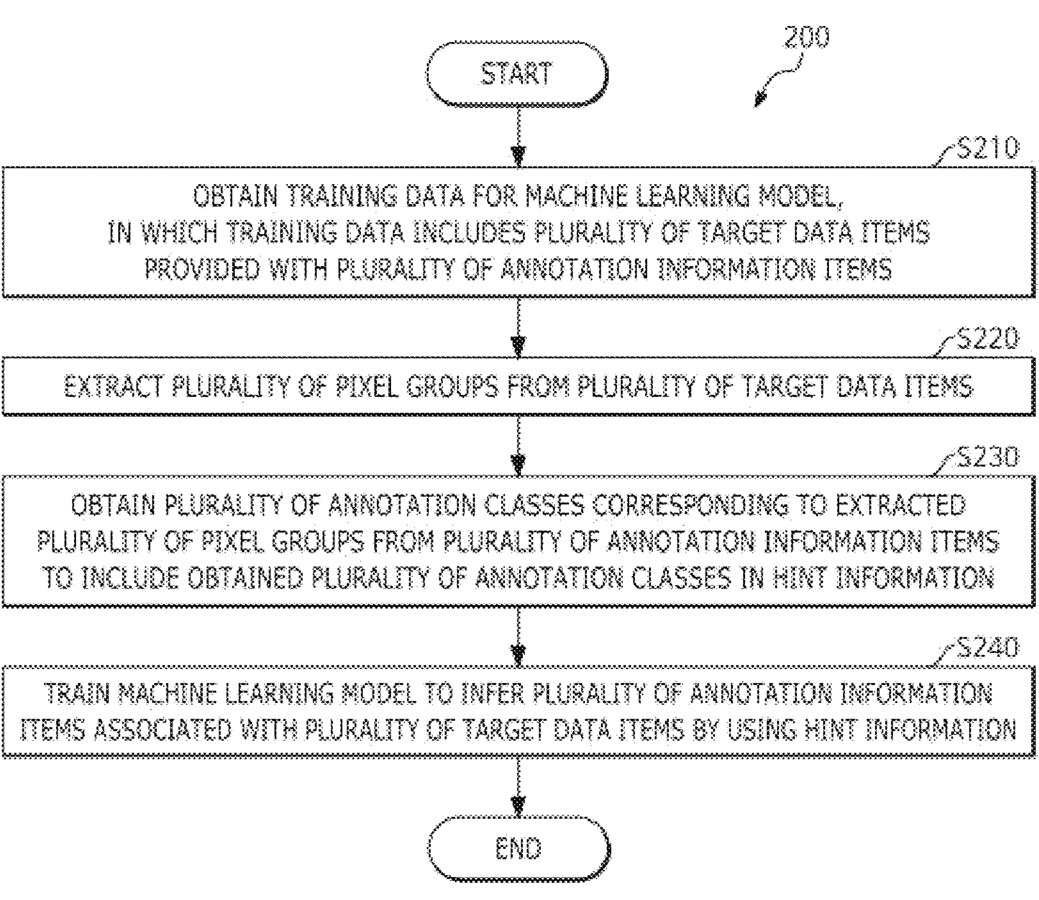
FIG. 2 is an exemplary flowchart illustrating a method for training a hint-based machine learning model configured to infer annotation information for target data according to an embodiment.

FIG. 2 is an exemplary flowchart illustrating a method for training a hint-based machine learning model configured to infer annotation information for target data according to an embodiment. According to an embodiment, a method 200 for training a hint-based machine learning model may be performed by an information processing system (e.g., the information processing system 100). Additionally or alternatively, the method 200 may be performed by the annotator terminal (e.g., annotator terminal 110). As illustrated, the method 200 may begin with S210 of obtaining training data for a machine learning model, including a plurality of target data items provided with a plurality of annotation information items. For example, the plurality of target data items may include a pathological slide scan image, and a plurality of patch images included in the pathological slide scan image. In addition, the plurality of annotation information items may include a plurality of label information items corresponding to the plurality of patch images. For example, the plurality of label information items may include a cell panel (e.g., immune cells, cancer cells, etc.), a tissue panel (e.g., cancer epithelium), and cancer stroma, etc. included in the plurality of patch images.

Then, at S220, a plurality of pixel groups may be extracted from the plurality of target data items. In an example, the extracted plurality of pixel groups may be included in the hint information. According to an embodiment, the plurality of pixel groups may include regions corresponding to the hint information from a plurality of target data items. For example, the information processing system may extract at least a partial region in each of the plurality of target data items as a plurality of pixel groups of the hint information.

According to an embodiment, each of the plurality of pixel groups may include a plurality of pixels forming a shape same as or similar to a shape which may be input by an annotator (e.g., the annotator 130) from the annotator terminal (e.g., the annotator terminal 110). For example, a plurality of pixel groups may include a shape representing or characterizing the initial input, the simple annotation input, the rough annotation, the scribble annotation, the minimal annotation, the initial annotation, at least one or more points, lines, curves, figures (e.g., circles, triangles, rectangles, hexagons, etc.), etc., which are input as the hint information by the annotator.

Next, at S230, a plurality of annotation classes corresponding to a plurality of pixel groups extracted from a plurality of annotation information items may be obtained, and the obtained plurality of annotation classes may be included in the hint information. According to an embodiment, the plurality of annotation information items may include an annotation class corresponding to each of a plurality of pixels included in the plurality of target data items. The information processing system may obtain, from the plurality of annotation information items, a plurality of annotation classes corresponding to the extracted plurality of pixel groups. The plurality of pixel groups and the plurality of obtained annotation classes may be associated and stored as the hint information. For example, the information processing system may obtain a plurality of annotation classes corresponding to at least a partial region in each of the plurality of target data items to include them in the hint information.

Finally, at S240, the information processing system may use the hint information to train the hint-based machine learning model to infer the plurality of annotation information items associated with a plurality of target data items. In an example, the information processing system may generate, as the hint information, a plurality of pixel groups and a plurality of annotation classes similar to the hint information that may be received from the annotator terminal during inference through the hint-based machine learning model, and use them as the training data for the hint-based machine learning model.

Figure 3:
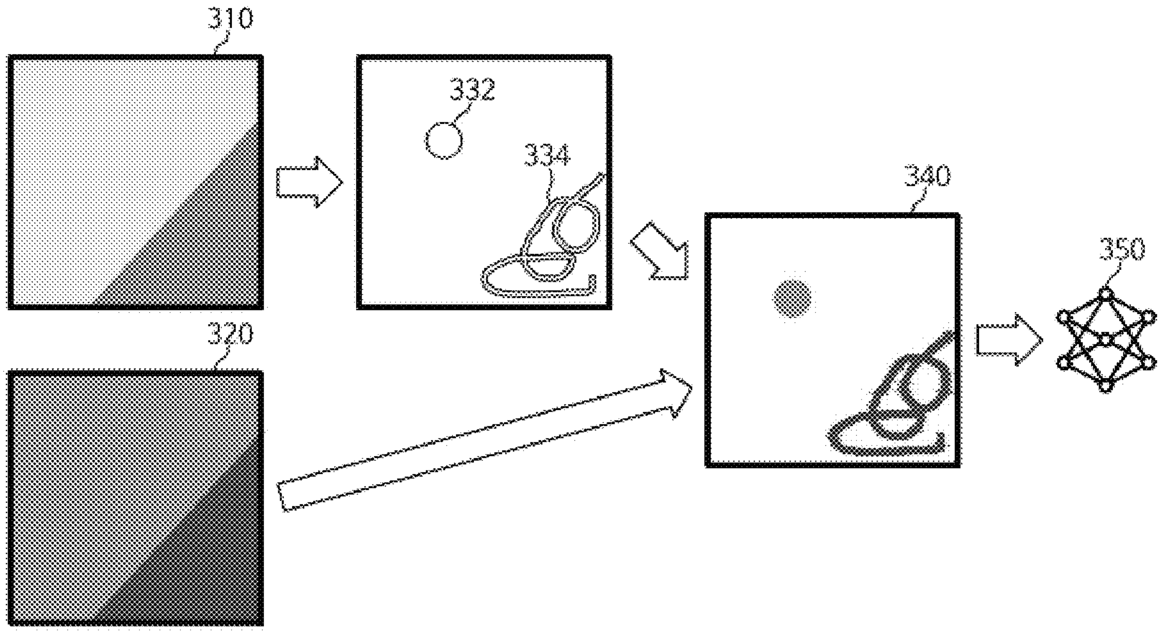
FIG. 3 is a diagram illustrating an example of training data of a hint-based machine learning model according to an embodiment.

FIG. 3 is a diagram illustrating an example of training data of a hint-based machine learning model 350 according to an embodiment. As illustrated, a set of training data used for the hint-based machine learning model 350 may include target data 310, an annotation information item 320 corresponding to a pixel included in the target data, and hint information 340. The hint information 340 may include a plurality of pixel groups 332 and 334 extracted from the target data 310, and annotation classes corresponding thereto. Among the annotation classes included in the annotation information item 320, an annotation class corresponding to a region corresponding to the plurality of pixel groups 332 and 334 may be obtained. While one target data item 310 is illustrated herein for convenience of explanation, the training data for the machine learning model may include a plurality of target data items and the hint information corresponding thereto.

According to an embodiment, the target data 310 may include a pathological slide image or a patch image. For example, the target data 310 may refer to an image including one or more tissue structures (e.g., cancer epithelium, cancer stroma, etc.) and/or cells (e.g., cancer cells, immune cells, etc.). While FIG. 3 shows the patch image as the target data 310 including two different regions, embodiment is not limited thereto, and a patch image including three or more different regions may be used as the target data item.

The annotation information item 320 may include an annotation class corresponding to the target data 310. For example, when the target data is a patch image, the annotation information item 320 may include any information (e.g., cancer cells, immune cells, cancer stromal regions or cancer epithelial regions, etc.) representing or characterizing a specific region. Such an annotation information item may be represented as one class among a plurality of classes, and this may be referred to as an annotation class.

The plurality of pixel groups 332 and 334 may be generated by extracting a specific shape representing at least one point, line, any figure, or any combination of these, from the target data 310. For example, as illustrated, a partial region corresponding to a circle shape included in the patch image that is the target data 310 may be extracted as one pixel group 332. Likewise, a partial region corresponding to a curved shape included in the patch image that is the target data 310 may be extracted as another pixel group 334.

As illustrated in FIG. 3, the hint information 340 may include shape information of the extracted plurality of pixel groups 332 and 334, and an annotation class representing the region corresponding to the shape information. As illustrated, in the annotation information item 320, a region corresponding to the pixel group 332 representing a circular shape represents blue color, and thus, a blue color may be encoded in the region corresponding to the pixel group 332. Likewise, a region corresponding to the pixel group 334 representing the curved shape in the annotation information item 320 represents red color, and thus, a red color may be encoded in the region corresponding to the pixel group 334. In an example, red and blue colors may represent one of a plurality of annotation classes, and may be associated with any information (e.g., cancer cells, immune cells, cancer stromal regions or cancer epithelial regions, etc.) represented or characterized by the corresponding region. In an example, a plurality of annotation information or annotation classes are displayed in color, but not limited thereto, and may be displayed as any information that can be displayed in association with specific information. While FIG. 3 illustrates one set of training data of the hint-based machine learning model 350 for convenience of explanation, the present disclosure is not limited thereto, and the training data for the machine learning model 350 may include a plurality of sets having a similar structure to the set shown in FIG. 3.

The information processing system may train the hint-based machine learning model 350 by using hint information including a plurality of pixel groups and a plurality of annotation classes corresponding thereto. According to an embodiment, the hint-based machine learning model 350 may be trained such that the hint-based machine learning model 350 receive not only the hint information but also the target data 310 as an input, and output the annotation information item 320. For example, the hint information may be encoded in the target data 310 and input to the hint-based machine learning model 350. As another example, the hint information may be input to the hint-based machine learning model 350 as data separate from the target data 310.

Figure 4:
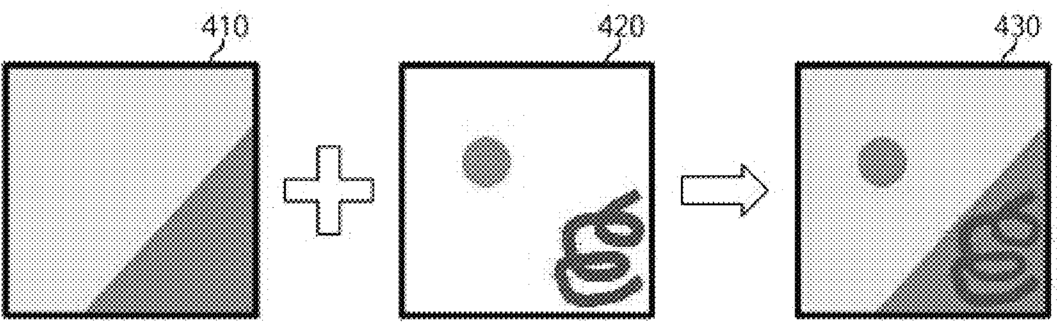
FIG. 4 is a diagram illustrating an example of using encoded target data as training data according to an embodiment.

FIG. 4 is a diagram illustrating an example of using encoded target data as training data according to an embodiment. The information processing system (e.g., the information processing system 100) may use the hint information 420 to train the machine learning model (e.g., the machine learning model 350) to infer one or more annotation information items associated with the target data item 410. While one target data item 410 is illustrated herein for convenience of explanation, the training data for the machine learning model may include a plurality of target data items and the hint information corresponding thereto, and furthermore, a plurality of encoded target data items.

In an embodiment, in order to generate training data of the hint-based machine learning model, the information processing system may encode the hint information 420 into the target data item 410. For example, when the target data item 410 is a pathological slide image, an encoded target data item 430 may be generated in such a form that at least a part of the tissue structure or cell of the target data item 410 is displayed, with respective classes being expressed with different indications. For example, the hint information 420 may be expressed in the form of a color, a numerical value, a pattern, etc., and may be encoded in the target data item 410. A specific method for encoding the hint information 420 will be described below in more detail with reference to FIGS. 6 to 8.

In an embodiment, the information processing system may input the plurality of target data items encoded with the hint information into the hint-based machine learning model and train the machine learning model to infer a plurality of annotation information items associated with the plurality of target data items. For example, the hint-based machine learning model may receive at least one patch image in which at least a part of a tissue structure and/or a cell is indicated, and trained to infer one or more annotation information items (e.g., cancer cells, immune cells, cancer stromal regions or cancer epithelial regions, etc.) included in the at least one patch image.

While FIG. 4 illustrates the hint-based machine learning model as being trained using the target data item in which the hint information is encoded, the present disclosure is not limited thereto, and it may be trained using a plurality of data items in which the hint information is not encoded. That is, for the training data for the hint-based machine learning model, the information processing system may use not only the target data item in which the hint information is encoded, but also the target data item in which the hint information is not encoded. For example, when the target data item is a patch image, both the patch image in which the hint information is encoded and an original patch image may be used to train the hint-based machine learning model.

Figure 5:
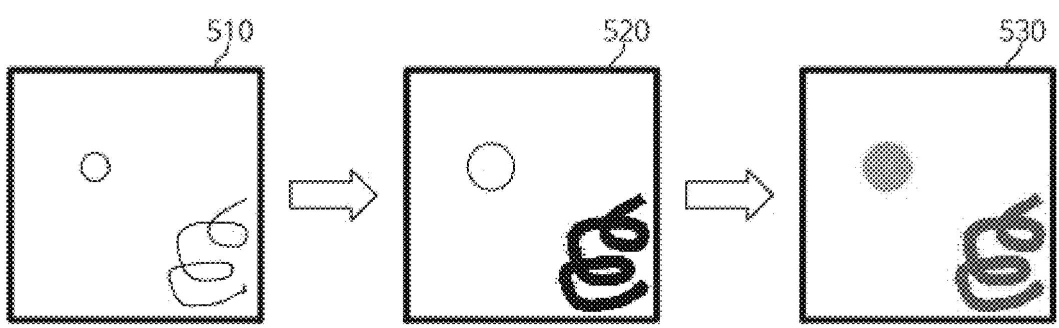
FIG. 5 is a diagram illustrating an example of expanding hint information in target data according to an embodiment.

FIG. 5 is a diagram illustrating an example of extending hint information in target data according to an embodiment. The information processing system (e.g., the information processing system 100) may expand a region corresponding to a plurality of pixel groups extracted from a plurality of target data items. The plurality of annotation information items corresponding to the plurality of pixel groups may be associated with the expanded region within the plurality of target data items. The expanded region and a plurality of annotation information items associated therewith may be included in the hint information for the training data of the machine learning model.

According to an embodiment, the information processing system may perform any processing to expand the shape of a plurality of pixel groups or to make them more clearly visible. For example, as illustrated in FIG. 5, the size of the region or the thickness of the line corresponding to each of the plurality of pixel groups 510 extracted from the target data item may be expanded. In this process, the information processing system may expand the region corresponding to each of the plurality of pixel groups 510 as far as the region corresponding to each of the plurality of pixel groups 510 does not intrude a region associated with a different annotation information item. For example, when a part of the plurality of pixel groups includes only the cancer epithelial region, the information processing system may expand the pixel group including the cancer epithelial region such that the expanded region 520 includes none except the cancer epithelial region.

In an embodiment, the information processing system may associate the plurality of annotation information items corresponding to the plurality of pixel groups 510 with the expanded region 520 within the plurality of target data items. For example, the information processing system may associate with an annotation information item corresponding to each of a plurality of expanded regions 520. For example, as illustrated in hint information 530, blue color (e.g., cancer epithelium class) may be associated with the expanded circle region, and red color (e.g., cancer stroma class) may be associated with the expanded line region.

Figure 7:
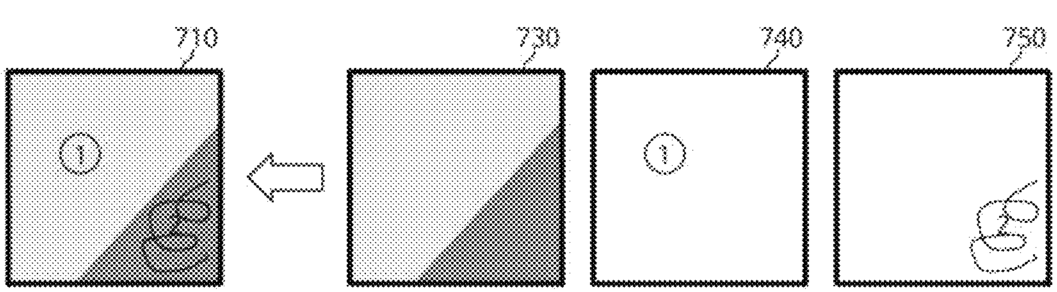
FIG. 7 is a diagram illustrating an example of numerically encoding hint information into target data according to an embodiment.
Figure 8:
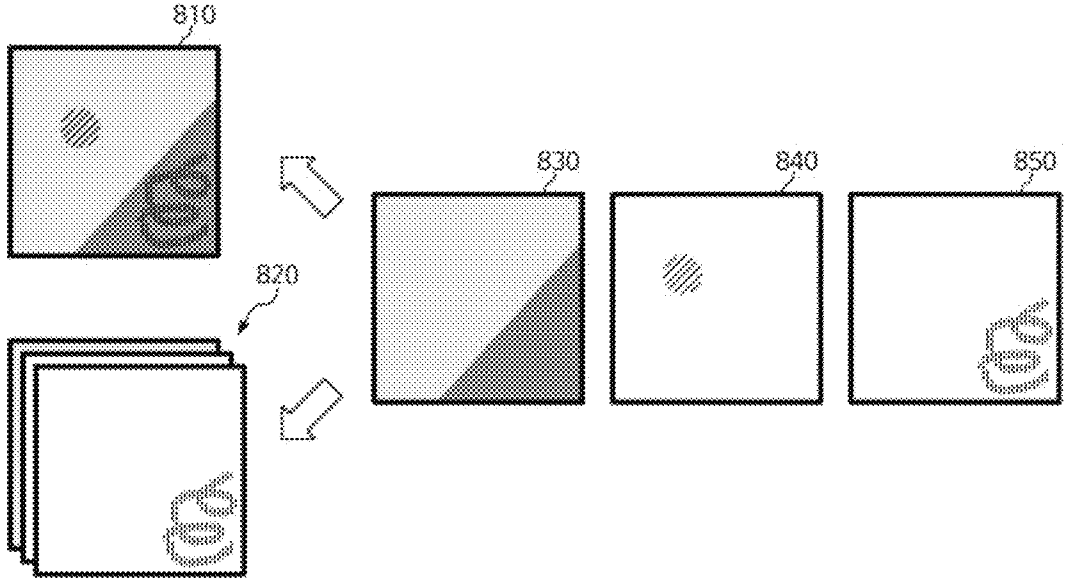
FIG. 8 is a diagram illustrating an example of encoding hint information in target data by a pattern according to an embodiment.

Hereinafter, various examples of encoding the hint information into the target data will be described with reference to FIGS. 6 to 8. The target data items 630, 730, and 830 illustrated in FIGS. 6 to 8 may refer to any patch image included in the pathological slide image, and different colors may be used to distinguish each of the various elements included in the patch image. While FIGS. 6 to 8 illustrate the patch image as including two different regions, embodiment is not limited thereto, and a patch image including three or more different regions may be used as the target data item.

Figure 6:
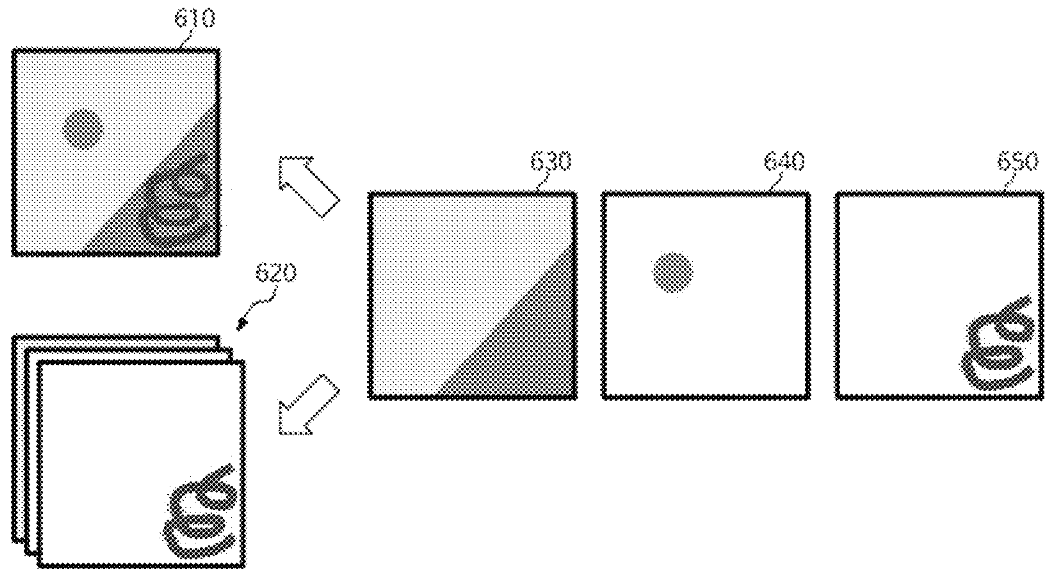
FIG. 6 is a diagram illustrating an example of encoding hint information into target data in color according to an embodiment.

FIG. 6 is a diagram illustrating an example of encoding hint information into target data in color according to an embodiment. In an embodiment, the information processing system (e.g., the information processing system 100) may determine colors representing the plurality of annotation classes 640, 650 included in the hint information associated with the target data item 630, by referring to the annotation information item corresponding to the target data item 630.

For example, the information processing system may determine blue color for the first annotation class 640 representing the cancer epithelium in the patch image, and red color for the second annotation class 650 representing the cancer stroma in the patch image, but embodiment is not limited thereto, and various colors may be used. While one target data item 630 is illustrated herein for convenience of description, it is understood that the information processing system may determine the colors representing a plurality of annotation classes included in the plurality of hint information associated with the plurality of target data items, by referring to the plurality of annotation information items corresponding to the plurality of target data items.

The color determined as described above may be applied to the pixel group extracted from the target data item 630. According to an embodiment, the color determined as described above may be applied to a separate channel in addition to the RGB value applied to the extracted pixel group, and applied in the extracted pixel group. For example, the information processing system may apply the blue color representing cancer epithelium to the circle-shaped pixel group determined as the first annotation class 640 and apply the red color representing the cancer stromal tissue to the pixel group in the curved shape determined as the second annotation class 650 to apply the colors representing the annotation classes to the extracted plurality of pixel groups. Accordingly, an image 610 may be generated as the training data for the hint-based machine learning model, in which the red color and the blue color are applied to regions corresponding to a plurality of pixel groups extracted from the target data item 630. According to another embodiment, the information on each of the colors determined as described above and the target data item 630 may be stored as a separate channel 620, and the stored separate channel 620 may be used to train the hint-based machine learning model.

FIG. 7 is a diagram illustrating an example of numerically encoding hint information into target data according to an embodiment. The information processing system (e.g., the information processing system 100) may add one or more channels to a plurality of target data items, and apply a numerical value representing a plurality of annotation classes included in the hint information to the added one or more channels. In an embodiment, the information processing system may apply numerical values representing a plurality of annotation classes 740 and 750 included in the hint information to one or more channels corresponding to the target data item 730, by referring to the annotation information item corresponding to the target data item 730.

While FIG. 7 illustrates a configuration that uses the numerical values when inputting the hint information through an additional channel, embodiment is not limited thereto, and any information that can represent or characterize the hint information may be included in the additional channel and provided as the hint information. According to an embodiment, a character string of a vector, a character, a special symbol, etc. may be provided as the hint information. For example, the hint information may be expressed with the hexadecimal numbers including numbers and letters and provided to additional channels.

For example, the information processing system may determine that the numerical value of the first annotation class 740 representing the cancer epithelium is “1,” and encode “1” in the pixel region corresponding to a plurality of pixel groups representing the cancer epithelium. Likewise, the information processing system may determine that the numerical value of the second annotation class 750 representing the cancer stroma is “2,” and encode “2” in the pixel region corresponding to a plurality of pixel groups representing the cancer stroma. The numerical values representing the plurality of annotation classes determined as described above may be configured as a single channel 710 and applied to the target data item 730. In addition, as described above, the numerical value of the first annotation class 740 and the numerical value of the second annotation class 750 may be expressed as a character string of a vector, a character, a special symbol, etc., in addition to a number.

According to another embodiment, the information processing system may express the numerical values representing the plurality of annotation classes 740 and 750 through a plurality of channels. For example, the information processing system may generate a first channel associated with the numerical value representing the first annotation class 740. Accordingly, the information processing system may determine “1,” which is the numerical value representing the cancer epithelium, for the first annotation class 740 by using the first channel. The numerical value "1" determined as described above may be associated with the region of the pixel group corresponding to the first annotation class 740 through the first channel, and the remaining region may be associated with "0," which is a numerical value opposite to "1." In addition, the information processing system may generate a second channel associated with the numerical value representing the second annotation class 750. Accordingly, the information processing system may determine "1," which is the numerical value representing the cancer stroma, for the second annotation class 750 by using the second channel. The numerical value "1" determined as described above may be associated with the region of the pixel group corresponding to the second annotation class 750 through the second channel, and the remaining region may be associated with "0," which is a numerical value opposite to "1."

In another embodiment, the information processing system may encode a numerical value representing a plurality of annotation classes 740 and 750 into a vector by using a plurality of channels. In an example, when three channels are encoded in the target data item 730, pixels included in the target data item 730 may be associated with a three-dimensional vector corresponding to the three channels. For example, the cancer epithelium corresponding to the first annotation class 740 may be represented as "(1, 0, 0)" through the three channels, and the cancer stroma corresponding to the second annotation class 750 may be represented as "(1, 0, 1)" through the same three channels, but the present disclosure is not limited thereto, and it may be represented by vectors of different dimensions and/or in different ways.

FIG. 8 is a diagram illustrating an example of encoding hint information in target data by patterns according to an embodiment. In an embodiment, the information processing system (e.g., the information processing system 100) may generate patterns representing the plurality of annotation classes 840 and 850 included in the hint information, by referring to the annotation information item corresponding to the target data item 830. For example, as illustrated, the first annotation class 840 representing the cancer epithelium may be determined as a diagonal pattern, and the second annotation class 850 representing the cancer stroma may be determined as a vertical line pattern. While FIG. 7 illustrates that patterns of diagonal and vertical lines corresponding to each annotation class are generated, the present disclosure is not limited thereto, and any different patterns (e.g., horizontal lines, oblique lines, crosshairs, grids, QR codes, etc.) capable of distinguishing the two classes may be generated.

The information processing system may apply the generated patterns to a plurality of pixel groups extracted from the target data item 830. According to an embodiment, the information processing system may apply the diagonal pattern representing the cancer epithelium to the circle-shaped pixel group determined as the first annotation class 840, and apply the vertical line pattern representing the cancer stroma to the plurality of pixel groups (e.g., line regions) determined as the second annotation class 850. For example, corresponding patterns may be applied to each pixel included in the first annotation class 840 and the second annotation class 850. As another example, corresponding patterns may be applied repeatedly to the pixel groups corresponding to the first annotation class 840 and the second annotation class 850.

According to an embodiment, the information processing system may generate one channel including the plurality of patterns generated as described above, and generate an image 810 in which the generated channel is applied to the target data. The image 810 generated as described above may be used to train the hint-based machine learning model. According to another embodiment, the information processing system may generate a channel for each of the plurality of generated patterns, and each channel may include a region corresponding to the information represented by the corresponding pattern, and information on other regions. The plurality of channels 820 and the target data items 830 generated as described above may be used for training the hint-based machine learning model.

Figure 9:
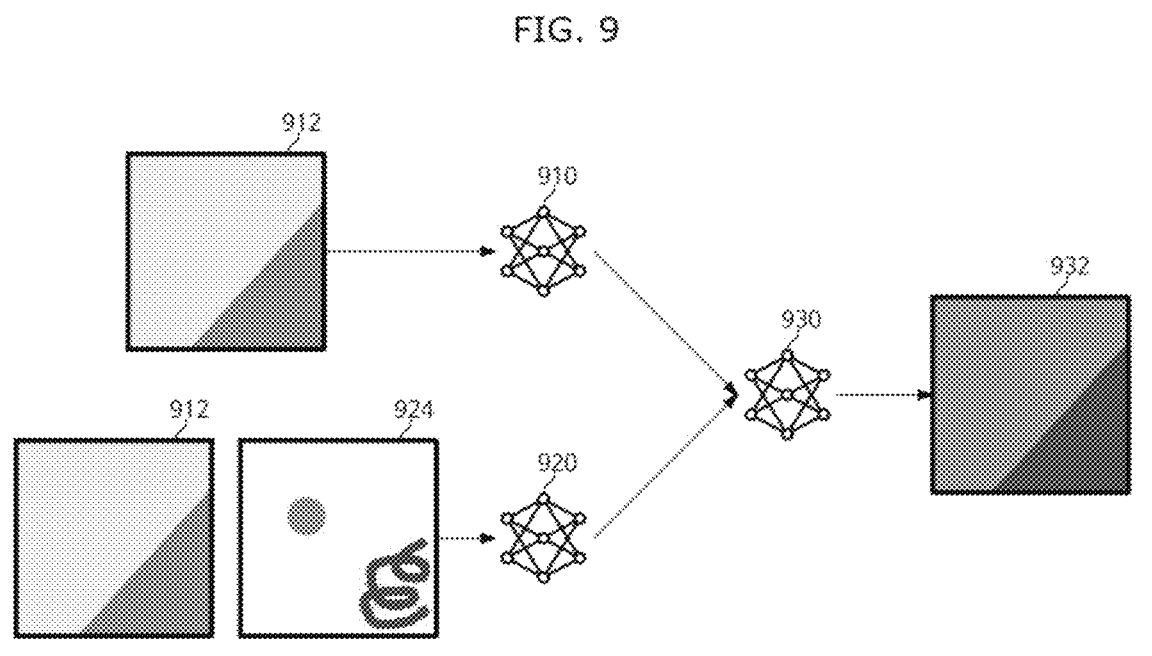

FIG. 9 is a diagram illustrating an example of inputting target data and hint information to a machine learning model respectively and inferring annotation information, according to another embodiment. According to an embodiment, as described above, hint information corresponding to a plurality of target data items may be separately generated, rather than being encoded in the corresponding target data items. In an example, the information processing system may input a plurality of target data items and hint information corresponding thereto into a hint-based machine learning model for training the machine learning model to infer a plurality of annotation information items associated with the plurality of target data items. Accordingly, the information processing system may be configured to input a plurality of target data items and hint information corresponding thereto into the trained hint-based machine learning model to infer at least one annotation information item associated with a plurality of target data items. While one target data item 912 is illustrated herein for convenience of explanation, the information processing system may be configured to input one target data item 912 and hint information 924 corresponding thereto into the trained hint-based machine learning model to infer at least one annotation information item associated with the one target data item.

According to an embodiment, the hint-based machine learning model may include a plurality of machine learning models rather than a single machine learning model. For example, as illustrated in FIG. 9, the hint-based machine learning model may include a first sub-machine learning model 910, a second sub-machine learning model 920, and a third sub-machine learning model 930.

The information processing system may input the target data item 912 into the first sub-machine learning model 910 and train the first sub-machine learning model 910 to output an annotation information item corresponding to each of the pixels included in the target data item 912. That is, the information processing system may train the first sub-machine learning model 910 without the hint information 924, by using the target data item 912 and the annotation information item corresponding to the target data item 912. In addition, the information processing system may input the target data item 912 and the hint information 924 to the second sub-machine learning model 920 to train the second sub-machine learning model 920 to output a region (e.g., an expanded region) within the target data item 912, which is referred to by, or included in the hint information 924. That is, the information processing system may train the second sub-machine learning model 920 by using the hint information 924 and the annotation information item corresponding to the target data item. Then, the information processing system may input the output of the first sub-machine learning model and the output of the second sub-machine learning model to the third sub-machine learning model 930 to train it to infer final annotation information 932 for each of the pixels included in the target data item 912.

While FIG. 9 illustrates that a plurality of sub-machine learning models form a hint-based machine learning model, the present disclosure is not limited thereto, and the hint-based machine learning model may be implemented as a single machine learning model to which a target data item and hint information corresponding thereto are respectively input. According to an embodiment, the information processing system (e.g., the information processing system 100) may input the hint information and a plurality of target data items into a single machine learning model to train the machine learning model so that the machine learning model infers annotation information associated with the plurality of target data items. For example, the hint information may not be encoded in the target data item, and the target data item and the corresponding hint information may be input into the machine learning model such that the machine learning model may be trained to infer the annotation information.

Figure 10:
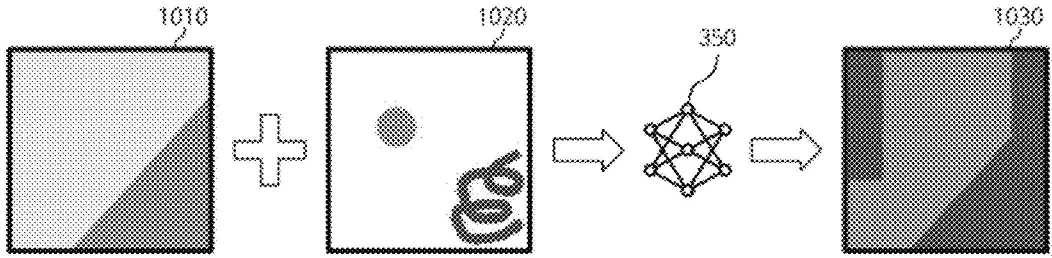
FIG. 10 is a diagram illustrating an example of inferring annotation information for target data through a hint-based machine learning model according to an embodiment.

FIG. 10 is a diagram illustrating an example of inferring annotation information for target data through a hint-based machine learning model according to an embodiment. The information processing system (e.g., the information processing system 100) may provide target data 1010 to the annotator terminal (e.g., the annotator terminal 110). For example, the information processing system may provide the target data 1010 to the annotator terminal in order to receive the first annotation information 1020 from the annotator terminal. In an example, the first annotation information 1020 may be generated by the annotator (e.g., the annotator 130), and may include simpler annotation information than general annotation, that is, the hint information. That is, the annotator may provide the hint information on the target data to the information processing system through a simple input.

The first annotation information 1020 may include the annotation information for the target data or part of the pixel group in the target data. According to an embodiment, the first annotation information 1020 may be annotation information in a simplified form rather than general annotation information about the target data, and may be annotation information of a less detailed level than general annotation information. For example, the annotation input of the annotator inputting the first annotation information 1020 as the hint information may include an initial input, a simple annotation input, a rough annotation, a scribble annotation, a minimal annotation, an initial annotation, at least one or more points, lines, curves, figures (e.g., circles, triangles, rectangles, hexagons, etc.), etc.

In an embodiment, the information processing system may receive the first annotation information 1020 for at least a partial region in the target data 1010 from the annotator terminal as the first hint information. For example, the annotator may generate the first annotation information 1020 through a simple annotation work based on the target data 1010 displayed on the annotator terminal. In an example, the first annotation information 1020 may include one or more pixel groups and annotation information corresponding thereto as the first hint information. At this time, at least the partial region in the target data 1010 designated by the annotator may be similar to the shape of the plurality of pixel groups described above with reference to FIG. 3.

In an embodiment, the information processing system may output the second annotation information 1030 for the target data 1010 through the hint-based machine learning model 350, by using the first annotation information 1020 and the target data 1010. The second annotation information 1030 for the target data 1010 output as described above may be provided to the annotator terminal. The second annotation information 1030 disclosed in FIG. 10 is a result inferred through the hint-based machine learning model, and while this is illustrated as the information including a part to be supplemented for convenience of explanation in FIG. 11, embodiment is not limited thereto, and accurate annotation information corresponding to the target data may be inferred.

According to another embodiment, the information processing system may input the target data 1010 into the machine learning model 350 to infer one or more initial annotation information items for the target data before providing the target data to the annotator terminal. The one or more initial annotation information items inferred as described above may be associated with the target data, and the target data associated with the one or more initial annotation information items may be provided to the annotator terminal. In response, the annotator may input the first annotation information for the target data associated with the one or more initial annotation information items, that is, input the hint information, and the target data applied or associated with the hint information may be provided to the information processing system. In an example, the first annotation information may include feedback information on at least some of one or more initial annotation information items. That is, the annotator may review the initial annotation information items and input, as the first annotation information, correction information for at least some of the initial annotation information items (e.g., erroneously inferred annotation information).

Figure 11:
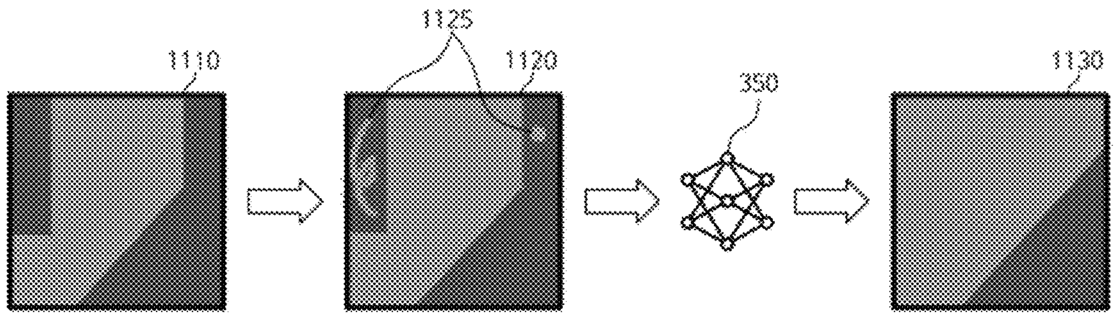
FIG. 11 is a diagram illustrating an example of re-inputting hint information and inferring final annotation information through a hint-based machine learning model, according to an embodiment.

FIG. 11 is a diagram illustrating an example of inferring final annotation information for a hint-based inference result through a hint-based machine learning model according to an embodiment. In an embodiment, the information processing system (e.g., the information processing system 100) may receive the target data including the second annotation information 1110 from the annotator terminal (e.g., the annotator terminal 110). At this time, the second annotation information 1110 may correspond to the second annotation information 1030 illustrated in FIG. 10, in which a certain part needs supplementation because the annotation information is not accurately input. Accordingly, the annotator may generate, as the second hint information, the third annotation information 1120 including information 1125 for correcting the second annotation information.

In an embodiment, the information processing system may output the fourth annotation information 1130 for the target data through the hint-based machine learning model 350 by using the second hint information and the target data. For example, the fourth annotation information 1130 may include the final annotation information inferred through the machine learning model 350. Then, the information processing system may provide the target data including the fourth annotation information 1130 to the annotator terminal. For example, when the fourth annotation information 1130 does not need correction, the annotator may confirm or complete the annotation work. The fourth annotation information 1130 and the corresponding target data confirmed by the annotator as described above may be provided to the information processing system and stored as a training dataset of the hint-based machine learning model. In an example, the confirmed fourth annotation information 1130 may be applied with a higher weight than that of a plurality of training data items included in the stored training dataset. In an example, the plurality of training data items may refer to annotation information not confirmed by the annotator. On the other hand, instead of the correctly inferred annotation information, the fourth annotation information 1130 may include annotation information that requires additional correction, in which case re-correction may be performed by the annotator accordingly.

As described above, the information processing system may receive information for correcting the annotation information input by the annotator, that is, receive the hint information and refine the annotation information for the target data, and the process for such refinement may be repeated. For example, the process for such refinement may be repeated until there is confirmation or completion from the annotator.

Figure 12:
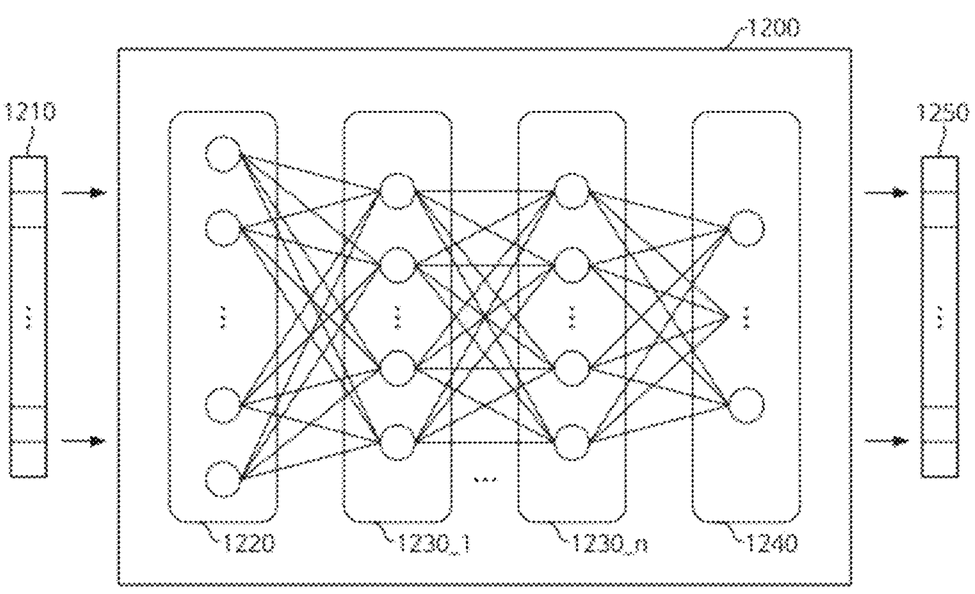
FIG. 12 is an exemplary diagram illustrating an artificial neural network model according to an exemplary embodiment.

FIG. 12 is an exemplary diagram illustrating an artificial neural network model according to an exemplary embodiment. In machine learning technology and cognitive science, the artificial neural network model 1200 refers to a statistical training algorithm implemented based on a structure of a biological neural network, or to a structure that executes such algorithm.

According to an embodiment, the artificial neural network model 1200 may represent a machine learning model that obtains a problem solving ability by repeatedly adjusting the weights of synapses by the nodes that are artificial neurons forming the network through synaptic combinations as in the biological neural networks, thus training to reduce errors between a target output corresponding to a specific input and a deduced output. For example, the artificial neural network model 1200 may include any probability model, neural network model, etc., that is used in artificial intelligence learning methods such as machine learning and deep learning.

According to an embodiment, the artificial neural network model 1200 may include an artificial neural network model configured to receive target data including hint information and output annotation information. When the hint information generated through annotation work is input to the artificial neural network model 1200, the annotation information for the target data may be output.

The artificial neural network model 1200 is implemented as a multilayer perceptron (MLP) formed of multiple nodes and connections between them. The artificial neural network model 1200 according to an embodiment may be implemented using one of various artificial neural network model structures including the MLP. As shown in FIG. 12, the artificial neural network model 1200 includes an input layer 1220 receiving an input signal or data 1210 from the outside, an output layer 1240 outputting an output signal or data 1250 corresponding to the input data, and (n) number of hidden layers 1230_1 to **1230_*n* (where n is a positive integer) positioned between the input layer 1220 and the output layer 1240 to receive a signal from the input layer 1220, extract the features, and transmit the features to the output layer 1240. In an example, the output layer 1240 receives signals from the hidden layers 1230_1 to 1230_*n*** and outputs them to the outside.

The method of training the artificial neural network model 1200 includes the supervised learning that trains to optimize for solving a problem with inputs of teacher signals (correct answer), and the unsupervised learning that does not require a teacher signal. The information processing system may use the target data to perform an analysis of the input image with the supervised learning to output the annotation information for the target data, and train the artificial neural network model 1200 to infer label information corresponding to the target data. In an example, the information processing system may perform the supervised learning of the machine learning model by using the annotation information for the target data from the annotator.

The artificial neural network model 1200 trained as described above may be stored in a storage system (e.g., the storage system 120), and output annotation information in response to an input of target data received from a communication interface and/or an annotator terminal (e.g., the annotator terminal 110) or a storage system.

According to an embodiment, as illustrated in FIG. 12, an input variable of the artificial neural network model 1200 capable of extracting the label information may be the target data (e.g., a pathological slide image or at least one patch included in the pathological slide image, etc.) applied with the hint information. For example, the hint information may be applied to the target data. In an example, the input variable input to the input layer 1220 of the artificial neural network model 1200 may be an image vector 1210 in which a training image is formed of one vector data element. As another example, the hint information may be input to the input layer 1220 of the artificial neural network model 1200 as data separate from the target data. In response to an input of the training image including the hint information, an output variable output from the output layer 1240 of the artificial neural network model 1200 may be a vector 1250 that represents or characterizes annotation information. In the present disclosure, the output variable of the artificial neural network model 1200 is not limited to the types described above, and may include any information/data representing the annotation information.

As described above, the input layer 1220 and the output layer 1240 of the artificial neural network model 1200 are respectively matched with a plurality of output variables corresponding to a plurality of input variables, and the synaptic values between nodes included in the input layer 1220, the hidden layers 1230_1 to **1230_*n*, and the output layer 1240 are adjusted, so that by training, a correct output corresponding to a specific input can be extracted. Through this training process, the features hidden in the input variables of the artificial neural network model 1200 may be confirmed, and the synaptic values (or weights) between the nodes of the artificial neural network model 1200 may be adjusted so as to reduce the errors between the output variable calculated based on the input variable and the target output. The artificial neural network model 1200** trained as described above may be utilized such that, in response to the target data including the input hint information, label information corresponding to the target data (e.g., a pathological slide image or at least one patch included in the pathological slide image, etc.) may be output.

Figure 13:
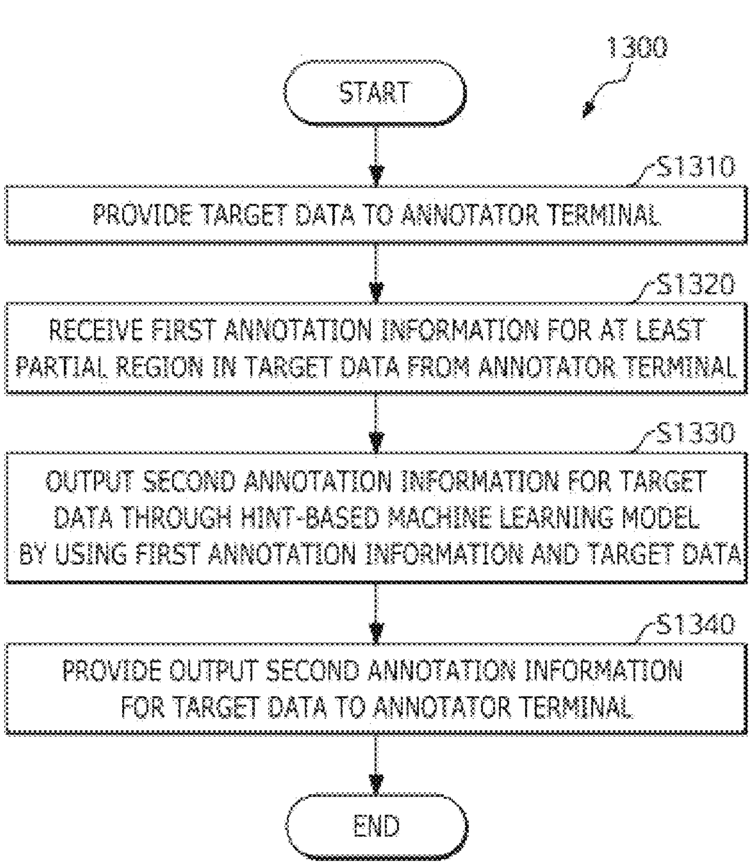
FIG. 13 is an exemplary flowchart illustrating a method for inferring through a hint-based machine learning model according to an embodiment.

FIG. 13 is an exemplary flowchart illustrating a method of inference of a hint-based machine learning model according to an embodiment. According to an embodiment, the method 1300 of inference of the hint-based machine learning model may be performed by an information processing system (e.g., the information processing system 100). Additionally or alternatively, the method 1300 may be performed by an annotator terminal (e.g., the annotator terminal 110). As illustrated, the method 1300 may begin with S1310 of providing the target data to the annotator terminal. For example, the target data may include a pathological slide scan image or at least one patch image included in such an image. In addition, the pathological slide scan image may include a cell panel (e.g., immune cells, cancer cells, etc.), or a tissue panel (e.g., cancer epithelium, cancer stroma, etc.).

Then, at S1320, the first annotation information for at least a partial region in the target data may be received from the annotator terminal as first hint information. For example, the first annotation information may include hint information corresponding to a partial region of the patch image. In addition, the hint information may include one or more pixel groups representing a specific shape and an annotation class for one or more pixel groups.

Next, at S1330, using the first annotation information and the target data, the second annotation information for the target data may be output through the hint-based machine learning model. For example, the second annotation information may include one or more label information items inferred for the target data by the information processing system based on the first annotation information.

Finally, at S1340, the output second annotation information for the target data may be provided to the annotator terminal. For example, the second annotation information may be provided to the annotator terminal to receive the third annotation information (e.g., correction information) for correcting the second annotation information from the annotator terminal, or to receive completion or confirmation for the second annotation information from the annotator terminal.

Then, feedback information on the second annotation information for the target data may be received from the annotator terminal. In one embodiment, the feedback information may include confirmation for the second annotation information. The confirmed second annotation information and target data may be stored. For example, the confirmed second annotation information and the target data may be stored as a training dataset for the hint-based machine learning model. The confirmed second annotation information is given a higher weight than that of a plurality of training data items included in the stored training dataset. In another embodiment, the feedback information may include third annotation information including information for correcting the second annotation information. The corrected third annotation information and the target data may be stored. For example, the confirmed second annotation information and the target data may be stored as a training dataset for the hint-based machine learning model.

Hereinafter, various examples of hint information will be described with reference to FIGS. 14 and 15. The hint information items 1420 and 1520 illustrated in FIGS. 14 and 15 may include a plurality of pixel groups extracted from the target data and the annotation classes corresponding thereto. In addition, the hint information items 1420 and 1520 may be used as the training data of a machine learning model (e.g., the machine learning model 350).

Figure 14:
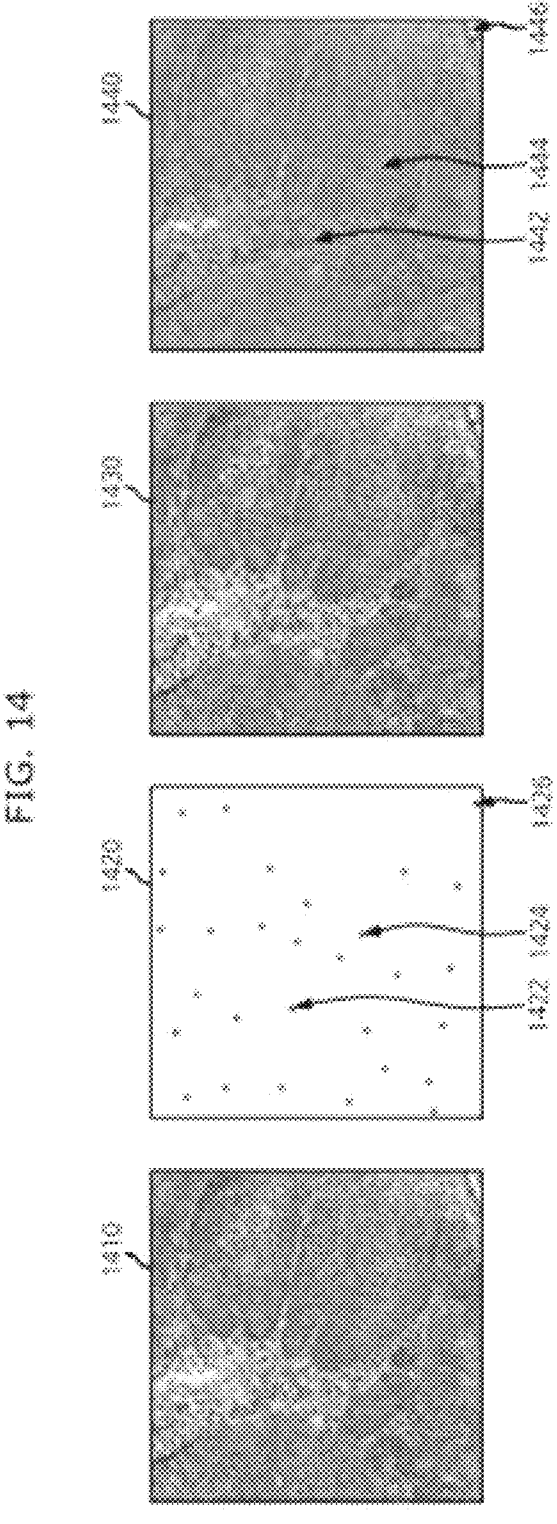
FIG. 14 is an exemplary diagram of a pathological slide image and point-type hint information as target data according to an embodiment.

FIG. 14 is an exemplary diagram of a pathological slide image and point-type hint information as target data according to an embodiment. Target data 1410 may include a pathological slide image or a patch image, as described above with reference to FIG. 3. For example, as illustrated, the target data 1410 may include pathological slide images including one or more tissue structures (e.g., cancer epithelium, cancer stroma, etc.) and/or cells (e.g., cancer cells, immune cells, etc.).

The hint information item 1420 may include a plurality of pixel groups and annotation classes corresponding thereto. In addition, the hint information item 1420 may include position information (e.g., pixel coordinate values) of one or more tissue structures included in the target data 1410 and an annotation class corresponding thereto, rather than a plurality of pixel groups. In addition, by the hint information item 1420, it may mean the first annotation information described above with reference to FIG. 10.

The hint information item 1422 may include position information of a cancer stroma structure, and cancer stroma class information. For example, the cancer stromal class may be color-encoded and displayed in green, as described above with reference to FIG. 4. The hint information item 1424 may include position information of a cancer epithelium structure, and cancer epithelium class information. For example, the cancer epithelial class may be color-encoded and displayed in blue color, as described above with reference to FIG. 4.

The hint information item 1426 may include position information of empty space, and empty space class information. For example, the empty space class may be color-encoded and displayed in orange color, as described above with reference to FIG. 4. While FIG. 14 illustrates three pieces of hint information, that is, a hint information item 1422, a hint information item 1424, and a hint information item 1426 for the target data 1410, the present disclosure is not limited thereto, and any number of hint information items may be displayed for the target data 1410. In addition, in FIG. 14, the hint information item 1422, the hint information item 1424, and the hint information item 1426 are displayed in three colors to distinguish between them, but any form or information for distinguishing each hint information item may be used.

Accordingly, an image 1430 in which hint information is encoded in the target data 1410 may be generated. The image 1430 in which hint information is encoded may be generated in a manner similar to the example provided above to describe the color encoding with reference to FIG. 6.

As illustrated, the inference result 1440 may include a plurality of annotation information 1442, 1444, and 1446. That is, the inference result 1440 may include a result inferred by the hint information-based machine learning model (e.g., the machine learning model 350) based on the target data 1410 and the hint information item 1420. Alternatively, the inference result 1440 may include the result inferred by the input without the hint information item 1420, i.e., by the input of only the target data 1410 into the hint information-based machine learning model. Alternatively, the inference result 1440 may include complete annotation information input by an annotator (e.g., the annotator 130) or inferred by a machine learning model.

According to an embodiment, the annotation information 1442 may include a plurality of pixel groups including a cancer stroma structure, and cancer stroma class information. For example, the annotation information 1442 may include all cancer stromal regions included in the target data 1410, which are inferred based on the hint information item 1422 representing the cancer stromal class. In addition, the annotation information 1442 may be color-encoded and displayed in green as illustrated.

According to an embodiment, the annotation information 1444 may include a plurality of pixel groups including a cancer epithelium structure, and cancer epithelium class information. For example, the annotation information 1444 may include all cancer epithelial regions included in the target data 1410, which are inferred based on the hint information item 1424 representing the cancer epithelial class. In addition, the annotation information 1444 may be color-encoded and displayed in blue color as illustrated.

According to an embodiment, the annotation information 1446 may include a plurality of pixel groups including empty spaces, and empty space class information. For example, the annotation information 1446 may include all empty spaces included in the target data 1410, which are inferred based on the hint information item 1426 representing the empty space. In addition, the annotation information 1446 may be color-encoded and displayed in orange color as illustrated.

According to an embodiment, the information processing system (e.g., the information processing system 100) may provide the pathological slide image including the inference result 1440 generated as described above to the annotator terminal (e.g., the annotator terminal 110). In response, the annotator may display the hint information again for the inference result 1440 on the pathological slide image, and provide the pathological slide image including the displayed hint information to the information processing system. The pathological slide image including the hint information displayed again as described above may be input into the hint-based machine learning model, such that annotation information on the pathological slide image may be inferred again. According to this method, the information processing system may receive one or more annotation information, that is, receive the hint information from the annotator and refine the annotation information for the inferred target data, and the process for such refinement may be repeated until a final confirmation is received from the annotator.

Figure 15:
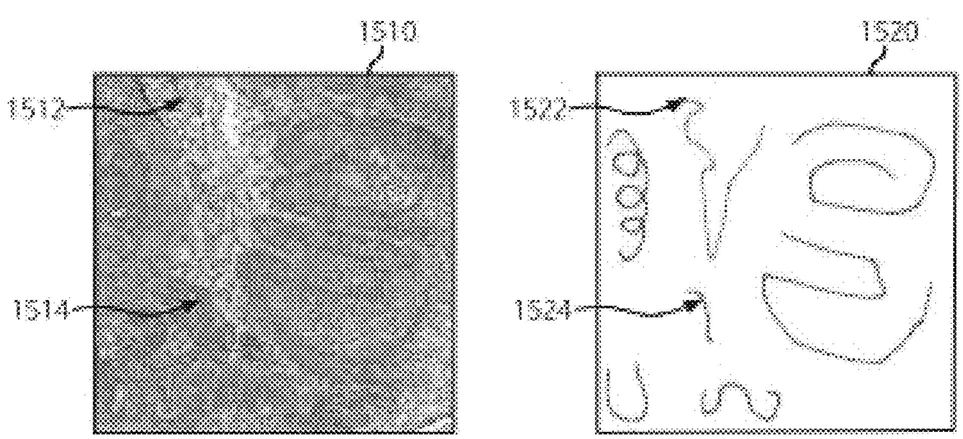
FIG. 15 is an exemplary diagram of a pathological slide image and line-type hint information as target data according to an embodiment.

FIG. 15 is an exemplary diagram of a pathological slide image and line-type hint information as target data according to an embodiment. The encoded image 1510 may include an image in which a hint information item 1520 expressed as a line is displayed in the target data (e.g., the target data 1410).

According to an embodiment, hint information items 1512 and 1522 may include a plurality of pixel groups located in the cancer stroma structure and cancer stroma class information. While FIG. 15 illustrates a plurality of pixel groups in a curved shape, the present disclosure is not limited thereto, and various shapes such as points, straight lines, figures, etc. may be configured. In addition, the cancer stromal class may be color-encoded and displayed in green as illustrated.

According to an embodiment, the hint information items 1514 and 1524 may include a plurality of pixel groups located in the cancer epithelium structure, and cancer epithelium class information. In addition, the cancer epithelial class may be color-encoded and displayed in blue color, as described above with reference to FIG. 4.

By the hint information item 1520 including the hint information items 1522 and 1524, it may refer to the first annotation information generated by an annotator (e.g., the annotator 130). These hint information items 1520 may be input to a hint-based machine learning model (e.g., machine learning model 350) and used as training data for training the machine learning model to infer the annotation information items for the target data.

According to an embodiment, the information processing system (e.g., the information processing system 100) may receive the image 1510 encoded with the hint information items 1512, 1514 for the target data, that is, for the pathological slide image or part thereof from an annotator terminal (e.g., annotator terminal 110). To this end, the annotator may display the hint information items 1522 and 1524 on the target data through the annotator terminal. In response, the information processing system may generate an image 1510 encoded with the hint information items 1512 and 1514 corresponding to the hint information items 1522 and 1524. The information processing system may input the encoded image 1510 into the hint-based machine learning model to infer or output annotation information in the target data. Accordingly, regions corresponding to cancer stroma and cancer epithelium in the target data may be displayed as an inference result.

Figure 16:
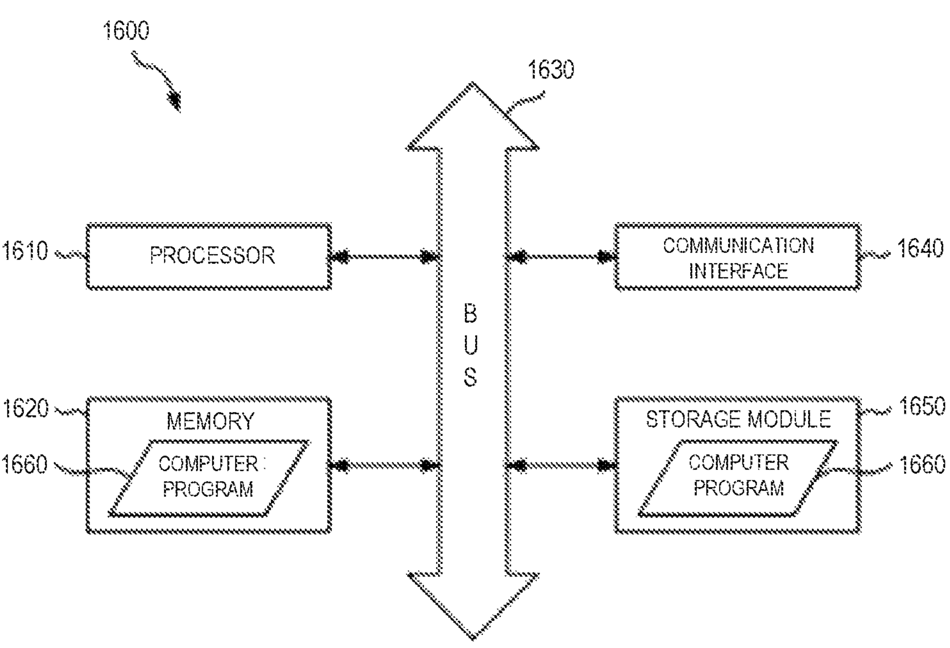
FIG. 16 is an exemplary configuration diagram illustrating a system for providing annotation information for target data according to an embodiment.

FIG. 16 is an exemplary configuration diagram illustrating a system for providing annotation information for target data according to an embodiment. As shown, the information processing system 100 or the annotator terminal 110 may include one or more processors 1610, a bus 1630, a communication interface 1640, a memory 1620 that loads a computer program 1660 executable by the processor 1610, and a storage module 1650 that stores the computer program 1660. However, FIG. 16 shows only certain components related to the embodiment of the present disclosure. Accordingly, those of ordinary skill in the art to which the present disclosure pertains will be able to recognize that other general-purpose components may be further included in addition to the components shown in FIG. 16.

The processor 1610 controls the overall operation of components of the information processing system 100. The processor 1610 may be configured to include a central processing unit (CPU), a micro processor unit (MPU), a micro controller unit (MCU), a graphic processing unit (GPU), or any type of processor well known in the technical field of the present disclosure. In addition, the processor 1610 may perform an arithmetic operation on at least one application or program for executing the method according to the embodiments of the present disclosure. The information processing system 100 may include one or more processors.

The memory 1620 may store various types of data, commands, and/or information. The memory 1620 may load one or more computer programs 1660 from the storage module 1650 in order to execute a method/operation according to various embodiments of the present disclosure. The memory 1620 may be implemented as a volatile memory such as RAM, but the technical scope of the present disclosure is not limited thereto.

The bus 1630 may provide a communication function between components of the information processing system 100. The bus 1630 may be implemented as various types of buses such as an address bus, a data bus, a control bus, or the like.

The communication interface 1640 may support wired/wireless Internet communication of the information processing system 100. In addition, the communication interface 1640 may support various communication methods other than Internet communication. To this end, the communication interface 1640 may be configured to include a communication module well known in the technical field of the present disclosure.

The storage module 1650 may non-temporarily store one or more computer programs 1660. The storage module 1650 may be configured to include a nonvolatile memory such as a read only memory (ROM), an erasable programmable ROM (EPROM), an electrically erasable programmable ROM (EEPROM), a flash memory, etc., a hard disk, a detachable disk, or any type of computer-readable recording medium well known in the art to which the present disclosure pertains.

The computer program 1660 may include one or more instructions that, when loaded into the memory 1620, cause the processor 1610 to perform an operation/method in accordance with various embodiments of the present disclosure. That is, the processor 1610 may perform operations/methods according to various embodiments of the present disclosure by executing one or more instructions.

For example, the computer program 1660 may include one or more instructions for causing the following operations to be performed: obtaining training data for a machine learning model, in which the training data may include a plurality of target data items provided with a plurality of annotation information items, extracting a plurality of pixel groups representing a specific shape from the plurality of target data items, obtaining, from a plurality of annotation information items, a plurality of annotation classes corresponding to the extracted plurality of pixel groups, and training the machine learning model so as to infer a plurality of annotation information items associated with the plurality of target data items, by using the hint information including the extracted plurality of pixel groups and the obtained plurality of annotation classes. In this case, the system for providing annotation information for target data through a hint-based machine learning model according to some embodiments of the present disclosure may be implemented through the information processing system 100.

The above description of the present disclosure is provided to enable those skilled in the art to make or use the present disclosure. Various modifications of the present disclosure will be readily apparent to those skilled in the art, and the general principles defined herein may be applied to various modifications without departing from the spirit or scope of the present disclosure. Thus, the present disclosure is not intended to be limited to the examples described herein but is intended to be accorded the broadest scope consistent with the principles and novel features disclosed herein.

Although example implementations may refer to utilizing aspects of the presently disclosed subject matter in the context of one or more standalone computer systems, the subject matter is not so limited, and they may be implemented in conjunction with any computing environment, such as a network or distributed computing environment. Furthermore, aspects of the presently disclosed subject matter may be implemented in or across a plurality of processing chips or devices, and storage may be similarly influenced across a plurality of devices. Such devices may include PCs, network servers, and handheld devices.

Although the present disclosure has been described in connection with some embodiments herein, it should be understood that various modifications and changes can be made without departing from the scope of the present disclosure, which can be understood by those skilled in the art to which the present disclosure pertains. In addition, such modifications and changes should be considered within the scope of the claims appended herein.

What is claimed is:

1. A method for providing annotation information for target data through a machine learning model, the method being performed by at least one computing device and comprising:

providing the target data to an annotator terminal;

receiving, from the annotator terminal, first annotation information for a region among at least one region corresponding to an annotation class in the target data, wherein the first annotation information corresponds to hint information for inferring the annotation class for the at least one region;

encoding the first annotation information into the target data, and inputting the target data and the encoded first annotation information into the machine learning model to obtain second annotation information for the target data, which is a result of inferring annotation information for the at least one region in the target data;

providing the second annotation information representing inferred annotation information for an entire region corresponding to the annotation class in the target data to the annotator terminal; and receiving, from the annotator terminal, feedback information for the second annotation information.

2. The method of claim 1, wherein receiving the feedback information comprises:

receiving, from the annotator terminal, confirmation for the second annotation information; and storing the confirmed second annotation information and the target data.

3. The method of claim 2, wherein storing comprises storing the confirmed second annotation information and the target data as a training data set for the machine learning model, and wherein the confirmed second annotation information is given a higher weight than that of a plurality of training-data items included in the training data set.

4. The method of claim 1, wherein receiving the feedback information comprises:

receiving, from the annotator terminal, third annotation information including information for modifying the second annotation information; and storing the received third annotation information and the target data.

5. The method of claim 4, wherein storing comprises storing the received third annotation information and the target data as a training data set for the machine learning model.

6. The method of claim 1, wherein the target data includes a pathological slide image or at least one patch image included in a pathological slide image.

7. The method of claim 1, wherein the first annotation information includes a pixel group corresponding to the region and the annotation class.

8. The method of claim 7, wherein the annotation class characterizes the region as at least one of a cancer cell, an immune cell, a tumor stroma region, or a tumor epithelial region.

9. The method of claim 1, wherein the receiving the first annotation information comprises receiving the first annotation information that is in a form of one or more points, lines, curves, and/or figures drawn to designate the region in the target data.

10. The method of claim 1, wherein the first annotation information corresponds to a part of a plurality of pixels included in the target data; and wherein the encoding the first annotation information into the target data comprises encoding the first annotation information into a pixel group corresponding to the region of the target data by applying at least one of a color, a value or a pattern representing the annotation class to the pixel group.

11. An information-processing system comprising:

a memory storing one or more instructions; and a processor configured to execute the stored one or more instructions to:

provide target data to an annotator terminal;

receive, from the annotator terminal, first annotation information for a region among at least one region corresponding to an annotation class in the target data, wherein the first annotation information corresponds to hint information for inferring the annotation class for the at least one region;

encode the first annotation information into the target data, and input the target data and the encoded first annotation information into a machine learning model to obtain second annotation information for the target data, which is a result of inferring annotation information for the at least one region in the target data;

provide the second annotation information representing inferred annotation information for an entire region corresponding to the annotation class in the target data to the annotator terminal; and receive, from the annotator terminal, feedback information for the second annotation information.

12. The information-processing system of claim 11, wherein the processor is further configured to:

receive, from the annotator terminal, confirmation for the second annotation information, and store the confirmed second annotation information and the target data.

13. The information-processing system of claim 12, wherein the processor is further configured to:

store the confirmed second annotation information and the target data as a training data set for the machine learning model, wherein the confirmed second annotation information is given a higher weight than that of a plurality of training-data items included in the training data set.

14. The information-processing system of claim 11, wherein the processor is further configured to:

receive, from the annotator terminal, third annotation information including information for modifying the second annotation information, and store the received third annotation information and the target data.

15. An annotator terminal comprising:

a memory storing one or more instructions; and a processor configured to execute the stored one or more instructions to:

obtain target data;

obtain first annotation information for a region among at least one region corresponding to an annotation class in the target data, wherein the first annotation information corresponds to hint information for inferring the annotation class for the at least one region;

output second annotation information representing inferred annotation information for an entire region corresponding to the annotation class in the target data, wherein the second annotation information is obtained by encoding the first annotation information into the target data, and inputting the target data and the encoded first annotation information into a machine learning model, which outputs a result of inferring annotation information for the at least one region in the target data, and provide feedback information for the second annotation information.

16. The annotator terminal of claim 15, wherein the processor is further configured to provide confirmation for the second annotation information, and wherein the confirmed second annotation information and the target data are stored as a training data set for the machine learning model.

17. The annotator terminal of claim 16, wherein the confirmed second annotation information is given a higher weight than that of a plurality of training-data items included in the training data set.

18. The annotator terminal of claim 15, wherein the processor is further configured to provide third annotation information including information for modifying the second annotation information, and wherein the third annotation information and the target data are stored as a training data set for the machine learning model.

19. The annotator terminal of claim 15, wherein the target data includes a pathological slide image or at least one patch image included in a pathological slide image.

20. The annotator terminal of claim 15, wherein the processor is further configured to obtain the first annotation information that is in a form of one or more points, lines, curves, and/or figures drawn to designate the region in the target data.

* * * * *